May 18, 1948.    H. Y. MAGEOCH    2,441,580
METHOD OF FORMING SCREW THREADS
Filed Dec. 8, 1945    2 Sheets-Sheet 1
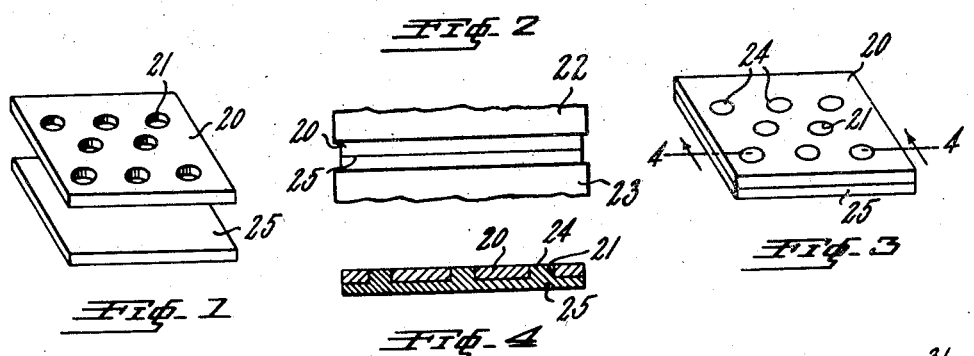
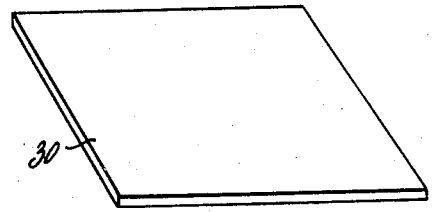
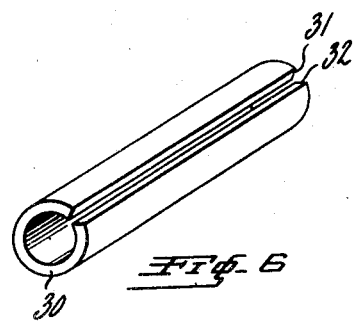
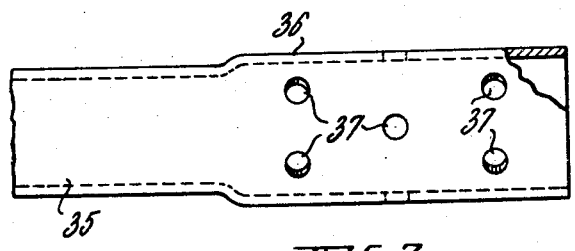
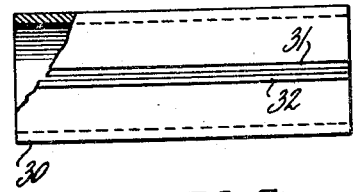
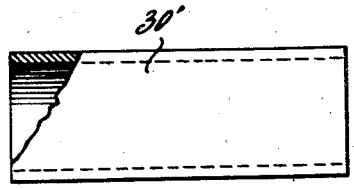
INVENTOR.
H. YALE MAGEOCH
BY
Richard A. Marsen
ATTORNEY May 18, 1948.    H. Y. MAGEOCH    2,441,580
METHOD OF FORMING SCREW THREADS
Filed Dec. 8, 1945    2 Sheets-Sheet 2
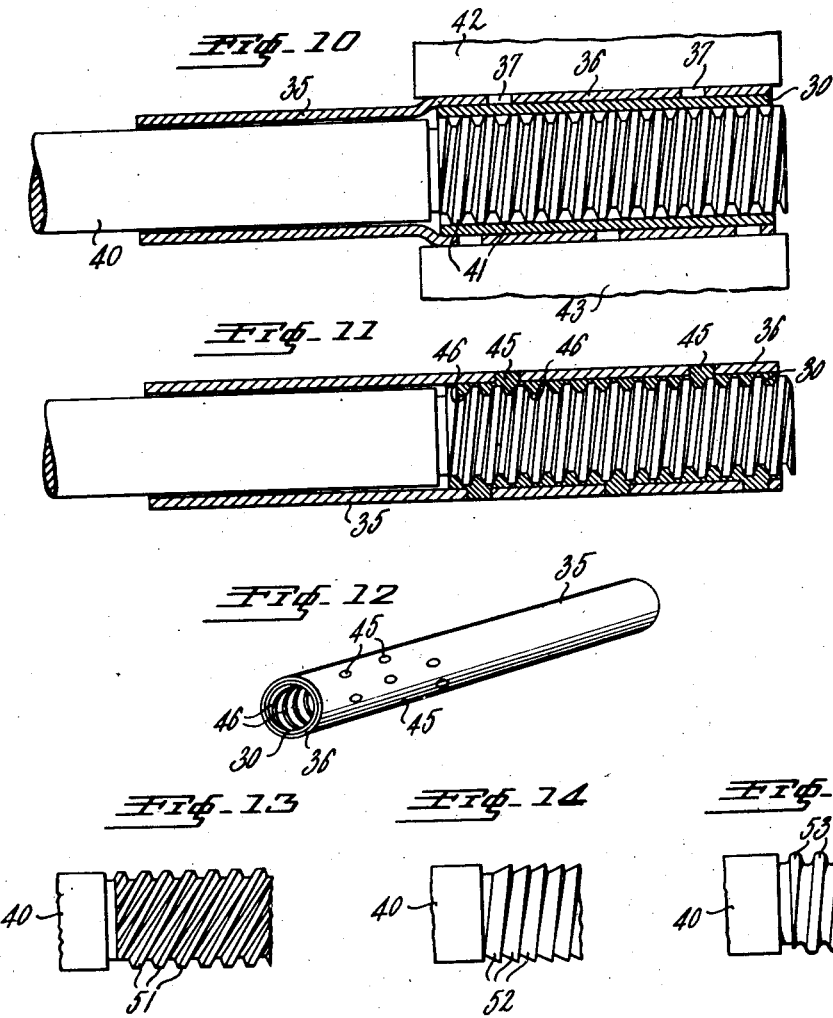
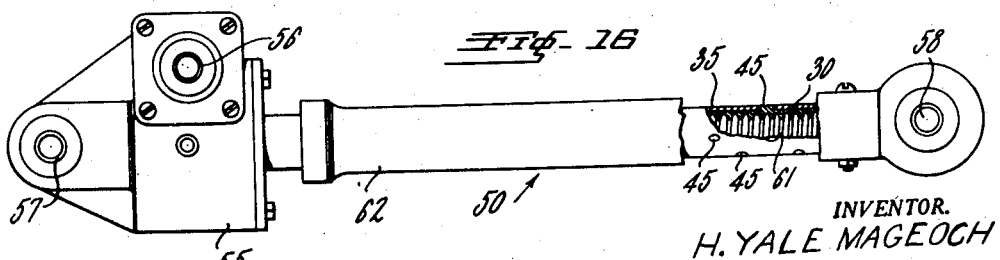
INVENTOR.
H. YALE MAGEOCH
BY
Richard A. Marsa
ATTORNEY Patented May 18, 1948

2,441,580

UNITED STATES PATENT OFFICE 2,441,580

METHOD OF FORMING SCREW THREADS

Harry Yale Mageoch, Upper Darby, Pa., assignor to Lear Incorporated, Piqua, Ohio, a corporation of Illinois Application December 8, 1945, Serial No. 633,711

7 Claims. (Cl. 10—86)

This invention relates to metal working and more particularly to a novel method of uniting dissimilar metals and forming threaded surfaces on metal members.

Various types of metals cannot be successfully united by welding or brazing. Furthermore, when metals are united by welding or brazing, the necessary heat input to the metal frequently disadvantageously affects the properties of the metal. Such effects are further pronounced when additional machining operations are performed upon the united members.

For instance, in the customary method of forming a torque tube element of a jackscrew, a tubular nut blank of suitable metal, such as bronze, is secured by brazing or welding within an outer supporting sleeve of stronger metal, such as steel. The assembly is then machined to form a thread on the nut blank. This operation is relatively expensive, and must be carefully controlled to insure uniform results.

In accordance with the present invention, two dissimilar metals are united by a cold working process. An important feature of the invention is the simultaneous uniting of two metal members and the simultaneous forming of screw threads or other predetermined configurations upon one of the members. The resultant cold worked assembly has desirable characteristics not possessed by similar assemblies formed according to the prior art methods, as well as being inexpensive as compared with the cost of such prior art assemblies.

It is among the objects of the present invention to provide a novel practical method of uniting dissimilar metal members by cold working; to provide such a method in which a softer metal member is united to a relatively harder metal member by having portions of the softer metal displaced through apertures in the harder metal; to provide a method of uniting metal members by cold swaging operations; to provide a method of forming an assembly in which a blank is united to a supporting member and at the same time formed with a predetermined configuration, all by cold working; to provide a method of forming a torque tube for a jack screw in which a substantially tubular nut blank is inserted in an outer sleeve and the assembly is cold worked to displace portions of the nut blank through apertures in the outer sleeve while simultaneously forming threads on the nut blank; to provide a simple, inexpensive and efficient method of threading metal members resulting in improved surfaces on the threads; to provide an efficient improved method of threading metal members by cold working; and to provide articles formed by the foregoing methods.

These and other objects, advantages and novel features of the invention will be apparent from the following description and the accompanying drawings. In the drawings:

Figs. 1 through 3 represent successive steps in uniting dissimilar metal members according to the present invention.

Fig. 4 is a sectional view on the line 4—4 of Fig. 3.

Figs. 5 and 6 illustrate successive steps in the formation of a nut blank for use in the present invention.

Fig. 7 is an elevation view of a jackscrew torque tube processed for use with the invention method.

Fig. 8 is an elevation view of the nut blank shown in Fig. 6.

Fig. 9 is an elevation view of another form of nut blank which may be used with the torque tube of Fig. 7.

Figs. 10 and 11 are longitudinal sectional views illustrating steps in the method if the invention, as used to form a threaded torque tube.

Fig. 12 is a perspective view of a completed jack screw torque tube formed in accordance with the present invention.

Figs. 13 through 15 illustrate different forms of threaded mandrels which may be used with the present invention.

Fig. 16 is an elevation view, partly in section, of a linear actuator incorporating a torque tube formed in accordance with the principles of the present invention.

In practicing the method of the present invention, a pair of dissimilar metal members are physically united by a cold working process. For this purpose, a series of apertures are formed in the harder metal, the softer metal is placed in surface juxtaposition with the harder metal, and pressure is applied to both metals to deform the softer metal through the apertures in the harder metal to physically unite the two members. The invention finds particular applicability in the forming of threaded members, such as for torque tube assemblies for screw jacks. The invention will be described as applied to such operation although not limited thereto.

In forming a threaded torque tube, for instance, a sheet of copper, bronze, or other deformable metal is rolled or otherwise formed into a generally tubular shape. The tubular sheet, which serves as a nut blank, is then inserted into a tubular element of relatively harder metal, such as steel. The tubular element is previously formed with apertures over the area of prospective engagement with the bronze sheet. The assembly is then placed over a mandrel having a thread or threads of the type desired to be formed in the tubular nut blank. The whole assembly is then cold worked, as by rotary swaging, to deform the tubular sheet or nut blank, forcing some of the metal thereof through the apertures in the outer sleeve or element to unite the tubular nut blank to such element. At the same time, the inner surface of the sleeve or nut blank is displaced in contact with the mandrel to form threads or other predetermined configurations thereon. Due to the cold working, the resultant threads have desirable characteristics of strength, resilience and wear, greatly improved over threads formed by conventional machining means.

The invention finds particular applicability where various types of complicated threads are to be formed in a torque tube. Hitherto, the machining of such threads on the nut blank has been a relatively long and expensive process. In the present invention, threads, such as multiple lead threads, threads having unusual shapes, and other types of threads, are formed on a hardened mandrel. This mandrel may then be used in the process of the invention to quickly and accurately reproduce such threads on a large number of nut blanks which at the same time are united to the supporting element or torque tube.

Referring to Figs. 1 through 4 of the drawings, the invention is illustrated as broadly applied to the uniting of a pair of metal plates. In Fig. 1, a plate 20 of relatively hard material such as steel, is to be united to another plate 25 of relatively deformable metal such as copper, bronze, silver, gold, and so forth. Plate 25 is then placed in surface juxtaposition with plate 20 and pressure is applied to the both plates in any desired manner. Preferred methods of applying pressure may be by hammering or rolling.

As indicative of such pressure applying step, Fig. 2 illustrates the juxtaposed plates 20 and 25 as undergoing compression between a pair of pressure dies 22, 23. Under the applied pressure, the total combined thickness of plates 20 and 25 is reduced, and the metal of plate 25 is forced through the apertures 21 in plate 20. The plates are thus united by slugs 24 of the metal of plate 25 displaced through apertures 21 in plate 20.

Due to the cold working of the metal of the two plates in the joining operation, desirable characteristics are uniformly imparted to the plates which characteristics cannot be obtained when the plates are united by heat processes such as welding or brazing. Additionally, the thickness of the surface metal 25 applied to the base metal 20 may be accurately controlled to desired dimensions. Any type of surface metal 25 may be united to a base metal 20, irrespective of whether such metals may be easily inspected and tested, which is not always possible when the plates are united by other methods, as there is no easy or reliable method of measuring the efficiency of brazed or welded joints.

Figs. 5 through 12 illustrate the principles of the invention as applied to the formation of a torque tube for a linear actuator of the screw-jack type. Referring to Figs. 5 and 6, a plate 30 of any material desired for the threaded surfaces of the torque tube is rolled into a tubular shape with adjacent ends 31 and 32 of the plate 30 juxtaposed but not physically united. The supporting sleeve for the torque tube may comprise a tubular steel member 35 which has a portion 36 thereof enlarged in diameter as indicated in Fig. 7, and pierced to form apertures 37. The internal diameter of portion 36 is substantially equal to the external diameter of the nut blank 30 shown in Fig. 8. The material and the thickness of the nut blank 30 is selected in accordance with the desired characteristics of the completed torque tube.

While Fig. 6 shows one form of nut blank which may be used with the invention, the invention is not necessarily limited thereto. For instance, and as shown in Fig. 9, a nut blank 30' may be cut from an end of bronze or copper tubing and inserted into the portion 36 of torque tube 35. The tubing from which nut blank 30 is cut may be formed in any desirable manner and may be seamless tubing, welded tubing, brazed tubing and so forth, or be machined from bar stock.

As shown in Fig. 10, nut blank 30 is inserted within the enlarged portion 36 of torque tube 35 in which the apertures 37 have been formed. A hardened mandrel 40 formed with threads 41 of the requisite type and characteristics, is inserted into nut blank 30. Pressure is then applied to the assembly in any convenient manner, as indicated by the pressure dies 42 and 43 of Fig. 10, to deform the metal of member 30 through the apertures 37 of portion 36 of torque tube 35, and form slugs 45 of nut blank 30 uniting nut blank 30 to torque tube 35. At the same time, the diameter of portion 36 is reduced to equal that of the main portion of torque tube 35.

During such pressure operation, which is preferably applied by a rotary swaging method, the metal of nut blank 30 is deformed with respect to the threads 41 of mandrel 40 to form threads 46 on nut blank 30. As a result of the cold swaging operation, the threads 46 of nut blank 30 are cold worked resulting in a dense structure, having desirable characteristics of wear and long life. Furthermore, nut blank 30 is firmly physically united to torque tube 35 without the use of any heating operation which might disadvantageously affect the grain structure of blank 30.

The completed torque tube is shown in Fig. 12, which illustrates a nut blank 30 united to portion 36 of torque tube 35 by slugs of metal 45 and formed with threads 46 due to deforming of the metal of nut blank 30 around the threads 41 of mandrel 40.

Figs. 13, 14 and 15 illustrate how the invention may be used to provide threads of any desired type on nut blank 30. As shown in Fig. 13, mandrel 40 is provided with multiple lead threads 51. Hitherto, it has been a relatively expensive and time consuming operation to provide such a multiple lead thread on a nut blank secured inside of a torque tube. Several machining operations were required, and great care needed to insure uniformity and adherence to close tolerances. With the present invention, such care must be taken only with respect to forming the mandrel 40, which is hardened. The hardened mandrel may then be used with the method of the invention to form a large number of threaded torque tubes, having accurately formed threads of the desired characteristics therein.

Fig. 14 shows mandrel 40 as formed with a buttress thread 52, which is desirable for many applications. Fig. 15 shows mandrel 40 as formed with a "Whitworth" thread 53. This thread is generally similar in shape to the "Acme" thread drawn in Figs. 10 and 13. However, the edges are rounded, as may be noted in Fig. 15. Such rounded edges greatly prolong the life of mandrel 40 when used with the present invention over the life thereof when the mandrel is formed with the sharp edged "Acme" teeth shown in Figs. 10 and 13. The type of thread shown in Fig. 15 is preferred for use with the present invention where such thread can be successfully used in the resultant assembly.

Fig. 16 illustrates a complete linear actuator incorporating the present invention. The linear actuator may be of the type described and claimed in Patent No. 2,319,463 issued on May 18, 1943, to William P. Lear for "Mechanical actuator systems." Such linear actuator comprises a jackscrew, generally indicated at 50, secured to a gear housing 55 containing gearing driven by flexible shafting which may be connected to a coupling 56. A suitable mounting 57 is provided on gear housing 55 and a mounting 58 is provided on the outer end of the jackscrew. The linear actuator shown in Fig. 16 is particularly adaptable for use in operating movable elements of an aircraft, such as wing flaps, cowl flaps and so forth.

Jackscrew 50 includes a threaded member or screw 61 and torque tube 35 having threaded nut 30 united therewith by the method of the present invention. A dust sleeve 62 is secured for longitudinal movement with screw 61 so that the jackscrew is at all times protected from ingress of foreign matter. Details of the linear actuator shown in Fig. 16, aside from the torque tube formed in accordance with the present invention, are the same as those of the jackscrews described in said patent.

The present invention thus provides a simple and inexpensive method for uniting metal members and threading the same. As a result of the cold working, the desirable characteristics of the completed article are greatly improved due to the density of the structure. The invention method is cheaper, requires less skilled labor and saves a great deal of time and also material as compared to the prior art methods. Additionally, inspection of the assembled parts is made relatively easy in contrast to prior art methods such as welding or brazing.

The invention is applicable where particular surfaces having predetermined dimensions are to be applied to base metals. For instance, non-corrosive or long wearing metals, as silver, bronze, any of the precious metals, stainless steel or other metal surfaces may be quickly and easily applied to a base or supporting metal by the process of the present invention. The only requirement is that the surface metal to be applied to the base metal be malleable or deformable with a cold forging or swaging operation. The invention is also particularly advantageous where complex thread shapes or other configurations are needed, due to the elimination of the necessity of separately machining the threads or other configurations in each completed article. Both the forming of the surface on the base metal and the threading of such surface, are performed simultaneously in a single operation.

The desirable results of cold working are secured in the single step of the invention without necessity for an additional cold working operation. The surface finish, furthermore, is free of all tool marks and takes on a polish equal to that on the mandrel itself. The formation of the surface configurations by cold working is advantageous in that no resultant distortion or expensive heat treating is necessary. Furthermore, the cold working has the desirable advantage that the metallic structure has a relatively harder or denser boundary surface and a relatively softer core. The only operation in which care and accuracy is required is that of forming the mandrel, which may then be used for forming a large number of threaded torque tubes.

A specific material which may be used for the mandrel, is tool steel having a 59 to 61 Rockwell hardness on the C scale. The tool steel is brine quenched at 1550° F. and drawn at 300° F. for one hour. The outside diameter of the mandrel is then ground to the required dimension and threads are ground therein. The threaded mandrel is then drawn at 300° F. for another hour.

The invention has been more particularly described with relation to the production of a threaded torque tube, in order to illustrate a specific application thereof. However, it should be understood that the invention is not limited thereto, but may be used to form any desired surface configuration on the deformable member. For instance, the deformable member may be formed with splines for use as a jack end-fitting or for telescopic arrangements. Alternatively, there can be formed on the deformable member any other type of surface configuration desired. The invention thus is not limited solely to the production of a threaded member such as a nut.

While specific embodiments of the invention have been shown and described to illustrate the application of the principles thereof, it will be understood that the invention may be otherwise embodied without departing from such principles.

What is claimed is:

1. A method of forming a tubular nut comprising providing a support sleeve and forming apertures in the wall thereof; inserting a tubular element of deformable material into said sleeve adjacent the apertures therein; inserting a mandrel into said element, said mandrel having a male screw thread substantially coextensive with said element; and applying pressure to said sleeve to deform said element to force material of said element through said apertures to interlock said sleeve and element, and forcing material of said element against said screw thread to form a corresponding female thread within said element.

2. A method of forming a tubular nut comprising providing a support sleeve and forming apertures in the wall thereof; providing a plate of deformable material; shaping said plate to form a substantially tubular element; inserting said tubular element into said sleeve adjacent the apertures therein; inserting a mandrel into said element, said mandrel having a male screw thread substantially coextensive with said element; and applying pressure to said sleeve to deform said element against said screw thread to form a corresponding female thread within said element and to deform said element through said apertures to interlock said sleeve with said element.

3. A method of forming a tubular nut having a multiple lead thread comprising providing a support sleeve and forming apertures in the wall thereof; inserting a tubular element of deformable material into said sleeve adjacent the apertures therein; inserting a mandrel into said element, said mandrel having a male multiple lead thread substantially coextensive with said sleeve; and applying pressure to said sleeve to deform said element against said screw thread to form corresponding multiple lead threads in said element and to deform said element through said apertures to interlock said sleeve with said element.

4. A method of forming a tubular nut comprising providing a support sleeve and forming apertures in the wall thereof; providing a plate of deformable material; shaping said plate into an incompletely tubular element; inserting said tubular element into said sleeve adjacent the apertures therein; inserting a mandrel into said element, said mandrel having a male screw thread substantially coextensive with said sleeve; and applying pressure to said sleeve to deform said element against said mandrel to form corresponding female threads in said element and to deform said material through said apertures to interlock said sleeve with said element.

5. A method of forming screw threads by displacing a portion of the element to be provided with a threaded portion with respect to the remainder of the element; comprising forming apertures in such displaced portion; fitting a member of deformable material within such displaced portion and adjacent said apertures; engaging a mandrel with said member, said mandrel having a male screw thread substantially coextensive with said member; and applying pressure to said displaced portion to realign it with the remainder of said element, to deform said member against said mandrel to form a female thread corresponding to said male thread in said member and to deform the material of said member through said apertures to interlock said member and said element.

6. A method of forming a nut comprising providing a tubular element and forming apertures in the wall thereof; inserting a sleeve of deformable material in said element; inserting a mandrel within said sleeve, said mandrel having male threads substantially coextensive with said sleeve; and applying pressure to deform said sleeve against said mandrel to form corresponding female threads in said sleeve and to deform said material through said apertures to interlock said sleeve with said element.

7. A method of forming a nut comprising providing a tubular element; expanding a portion of said element to a diameter greater than that of the remainder of said element; forming apertures in the wall of such expanded portions; inserting a sleeve of deformable material into the expanded portion of said element and adjacent said apertures; inserting a mandrel having a male threaded portion substantially coextensive with said sleeve into said sleeve; and applying pressure to said expanded portion to realign it with the remainder of said element to deform said sleeve against said mandrel to form a corresponding female thread in said sleeve and to deform said sleeve through said apertures to interlock said sleeve with said tubular element.

H. YALE MAGEOCH.

REFERENCES CITED

The following references are of record in the file of this patent:

UNITED STATES PATENTS

| Number | Name | Date |
|---|---|---|
| 168,214 | Beddow | Sept. 28, 1875 |
| 543,607 | Bates | July 30, 1895 |
| 1,190,803 | Rosenfeld | July 11, 1916 |
| 1,212,608 | Calkins | Jan. 16, 1917 |
| 1,744,199 | Baker | Jan. 21, 1930 |
| 1,812,151 | Jacocks | June 30, 1931 |
| 2,216,686 | Fentress | Oct. 1, 1940 |
| 2,232,973 | Rood | Feb. 25, 1941 |